Oct. 21, 1947.　　　　S. L. APATOW　　　　2,429,303

ELECTRIC IMMERSION HEATER

Filed July 2, 1945

INVENTOR.
Simon L. Apatow
BY
　　*[signature]*
ATTORNEY

Patented Oct. 21, 1947

2,429,303

UNITED STATES PATENT OFFICE 2,429,303

ELECTRIC IMMERSION HEATER

Simon L. Apatow, Brentwood, N. Y.

Application July 2, 1945, Serial No. 602,843

11 Claims. (Cl. 219—41)

This invention relates to electric immersion heaters.

Many such heaters have been patented and sold, but in general they have not proven satisfactory due to their inefficient operation and expensive construction.

It is an object of the present invention to provide an improved electric immersion heater which will be relatively inexpensive to manufacture, durable in use and quick and efficient in operation.

More specifically, previous heaters created a hot stratum at the top of a liquid body and raised the liquid to its boiling point in this stratum while throughout the rest of the liquid, and particularly at the bottom, the temperature was well below boiling so that when the heater was deactivated the overall temperature of the liquid was not as high as thought or required. Such localized boiling also caused an undue spattering of the liquid. Pursuant to the present invention I have provided an immersion heater so constructed as to obtain a more uniform heating whereby when the liquid commences to boil the entire body thereof is substantially at the same temperature.

Other objects of the invention will in part be obvious and in part hereinafter pointed out.

The invention accordingly consists of the features of construction, combinations of elements and arrangement of parts which will be exemplified in the construction hereinafter described and of which the scope of application will be indicated in the claims.

In the accompanying drawings, in which is shown one of the various possible embodiments of the invention, Fig. 1 is a vertical section through an electric immersion heater embodying my invention as it appears in use;

Figure 1:
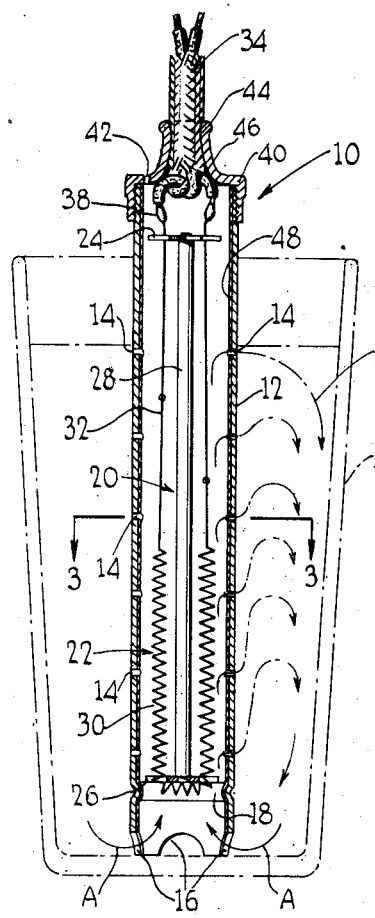

Referring now to the drawings, and more particularly to Figs. 1 through 4, 10 denotes an electric immersion heater constructed in accordance with my invention and comprising an open ended aluminum tubular casing 12 having a plurality of effluxive apertures 14 in its cylindrical side wall and several larger influxive notches 126 in its bottom edge. An annular bead 18 is raised interiorly of the casing near its lower end to support a frame 20 on which an electric resistance heating element 22 is disposed. Said frame includes upper and lower cruciform plates 24, 26 made from a plastic electrically non-conductive material which will not soften at the boiling point of water. By way of example, such material may include any one of the thermo-setting resins such as phenolic, urea or melamine resins. Alternatively I can employ a thermo-plastic resin, such as a polydichloro styrene resin (Styramic HT), which has a heat distortion point above the temperature of boiling water.

The plates 24, 26 are centrally apertured and force-fitted on the reduced ends of a spindle 28 made of the same material as the plates. If desired, the plates additionally may be adhesively secured to the spindle. The outer diameter of said plates is made slightly smaller than the inner diameter of the casing and slightly larger than the minimum diameter of the bead 18 so that the frame 20 can be slipped through the open upper end of the casing and rest upon said bead.

The electric resistance heating element 22 comprises a helical coil 30 of resistance wire, preferably of a type which is non-corrosive in water even when heated. For this purpose I may employ an iron or steel rendered stainless by the inclusion of a large percentage of chromium. Irons and steels of this type are well known to metallurgists.

Figure 3:
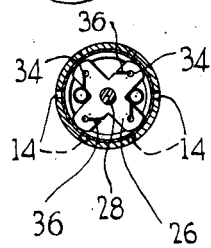
Fig. 3 is a sectional view taken substantially along the line 3—3 of Fig. 1.
Figure 2:
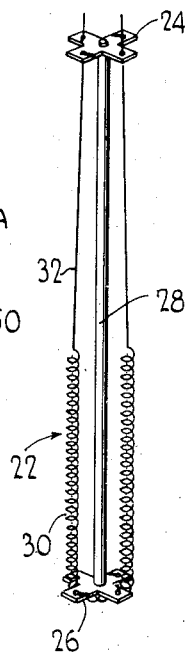
Fig. 2 is a detailed perspective of the heating element on its frame.

The length of the coil is about equal to the distance between the two plates 24, 26. Said coil is arranged on the frame 20 with a central portion thereof beneath the middle of the lower cruciform plate 26 and its two ends extending upwardly between opposite pairs of arms as indicated in Figs. 1, 2 and 3. Due to the relationship between the length of the helical coil and the spacing between the two cruciform plates, the upper ends of said coil are disposed about halfway between the plates and are thus located below and remote from the upper end of the casing and the uppermost of the effluxive apertures.

The ends of the coil are supplied with lead wires 32 which may constitute simply straight continuations of said coil ends. These lead wires are threaded through apertures 34 in the arms of the upper cruciform plate 24. Each aperture 34 has a narrow slot 36 leading therefrom to an edge of the arm in which it is disposed to facilitate threading of the wires. The ends of the lead wires are connected by brazing to the conductors of an electric supply cord 38.

The upper open end of the casing 12 is closed by a screw cap 40 having a vent hole 42 to prevent entrapment of air if the heater is immersed beyond the uppermost effluxive aperture. Said cap is provided with a tubular projection 44 in which the supply cord 38 is snugly received. If desired, the ends of the conductor are knotted within the casing, as at 46, to form a strain relief. The other end of the cord, not shown, has attached thereto a conventional means for connection to an electric outlet. The inside of the casing preferably is coated with a layer 48 of an insulating material.

Heaters embodying my invention are designed to be used with liquid receptacles of certain minimum heights. For example, if the heater 10 is five inches long and the upper ends of the coil are two and one-half inches from the bottom of the casing the intended use of the heater would be in a liquid receptacle having a normal water height of at least about three, and preferably at least three and one-half inches. The reason for this is that the heater is meant to be used to heat a liquid upon immersion therein to such an extent that the top ends of the coil 30 are substantially below the surface of the liquid an amount at least about equal to one-quarter of the depth thereof.

It will be noted that the liquid in which the heater is immersed will directly contact the resistance heating coil 30, thereby securing an extremely efficient conductive transfer of heat. This direct contact between the liquid and coil is due to the presence of the effluxive apertures 15 and influxive notches 16.

The irregular contour of the bottom edge of the casing caused by notches 16 serves a much more important function. When the coil 30 is energized it will heat liquid within the casing by conduction. This heated liquid will rise vertically in the casing and flow into the mass of liquid outside of the casing through the effluxive apertures 14. Cool liquid from the very bottom of the liquid body will enter the casing through the influxive notches 16. The flow of the liquid is indicated by the arrows A. It will thus be seen that a forced circulation is effected which causes convective heating to occur outside of the heater. This type of heating causes the temperature throughout the mass of liquid to be substantially the same at all times so that when the liquid is finally raised to its boiling point substantially all of the liquid will be at boiling temperature. The indicated circulation also serves to move the liquid rapidly past the heating coil, thus reducing the dead film and creating a high temperature differential for conductive heating, both of these being factors which increase heating efficiency. In addition, such circulation causes the coolest part of the liquid to be heated conductively whereby to keep the temperature of the liquid mass more uniform and further increase the aforesaid temperature differential.

It should be noted that, despite the presence of the influxive notches, if the heater extended to the top of the casing adjacent the uppermost of the effluxive apertures 14, there would be a tendency to stratify the heated liquid at this level and at the surface of the liquid, this being a cause heretofore for a liquid reaching its boiling temperature only at the surface thereof when heated by an immersion heater.

It also is pointed out that the construction of the heater is extremely simple, the same comprising relatively few parts which are inexpensive to make and easy to assemble.

Figure 5:
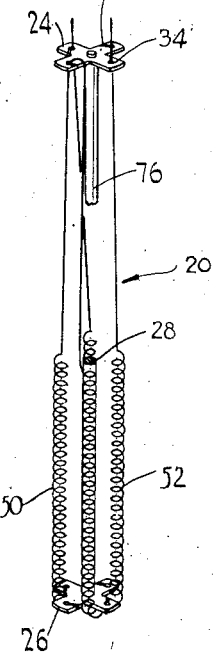

If a heater of another wattage is desired a different coil of about the same length and proper wattage can be supplied. Alternatively, two helical coils 50, 52 may be employed, as indicated in Fig. 5. Both coils are supported on the same frame 20, one being looped under one of the arms in the lower plate 26 and the other being looped under the opposite arm. The upper free ends of the coils are slipped through the slots 36 into the apertures 34 and said coil ends are connected either in series or in parallel depending upon the wattage desired.

Figure 6:
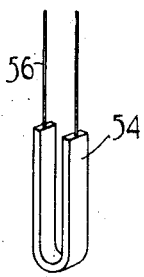
Figs. 5 and 6 are views similar to Fig. 2 of different forms of heating elements which can be used in heaters embodying my invention.
Figure 4:
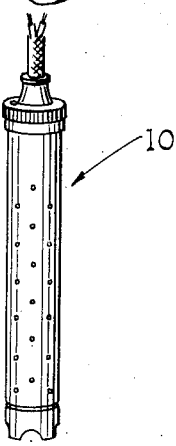
Fig. 4 is a perspective view of the heater.

Another type of heating element shown in Fig. 6 comprises a rustless iron bar 54 of high resistance such as is well known in the art. This bar is adapted to be mounted on the frame 20 in the same manner as the coil 30. Said bar is provided with lead wires 56 which serve to secure the bar to the upper plate 24 and connect the bar to the supply cord 34.

It will thus be seen that I have provided an immersion heater which achieves the several objects of this invention and which is well adapted to meet the conditions of practical use.

As various possible embodiments might be made of the above invention, and as various changes might be made of the embodiment above set forth, it is to be understood that all material herein described or shown in the accompanying drawings is to be interpreted as illustrative and not in a limiting sense.

Having thus described my invention, I claim as new and desire to secure by Letters Patent:

1. An electric immersion heater comprising an elongated hollow casing having an open lower end with influxive openings in its bottom edge and effluxive openings at vertically spaced points in its side walls, the top of said casing being closed and having a vent opening therein, and a bare, elongated electric resistance heating unit disposed within said casing in the space between said influxive and effluxive openings, the top end of said unit being remote from the top end of the casing and from the uppermost of said effluxive openings, whereby a liquid in which the heater is immersed will directly contact the heating element and a convection heating current be induced which flows along the bottom of the receptacle containing the liquid and up through the casing past the heating unit.

2. An electric immersion heater comprising a hollow casing having an open bottom end with influxive openings in its bottom edge and effluxive openings at vertically spaced points in its side walls, the top of said casing being closed and having a vent opening therein a frame in said casing, means to support said frame with its lower end above the influxive openings in the bottom edge of the casing, and a bare electric resistance heating element carried by said frame between said openings, said element having its top end below and remote from the uppermost of the effluxive openings, whereby a liquid in which the heater is immersed will directly contact the heating element and a convection heating current be induced which flows along the bottom of the receptacle containing the liquid and up through the casing past the heating unit.

3. An electric immersion heater comprising an elongated hollow casing having an open bottom end whose bottom edge includes portions disposed in different planes perpendicular to the longitudinal axis of the casing to form influxive openings, said casing having effluxive openings at vertically spaced points in its side walls, the top of said casing being closed and having a vent opening therein, a frame including a pair of insulating plates and means to hold said plates in spaced relationship, means to support said frame with its lower end above the influxive openings in the bottom edge of the casing, and a bare electric resistance heating element carried by said frame with its upper end below and remote from the uppermost of the effluxive openings, whereby a liquid in which the heater is immersed will directly contact the heating element and a convection heating current be induced which flows along the bottom of the receptacle containing the liquid and up through the casing past the heating unit.

4. An electric immersion heater as set forth in claim 3 wherein the casing is provided with an internal bead near its bottom edge on which the lowermost of the two insulating plates rests.

5. An electric immersion heater comprising an elongated hollow casing having an open bottom end and openings in the side wall thereof at vertically spaced points, the top of said casing being closed and having a vent opening therein, a frame in said casing, said frame including a spindle having cruciform plates secured to the upper and lower ends thereof, means to support said frame with its lower end above the open bottom end of the casing, and a resistance heating element carried by said frame, said resistance element being in the form of a U with the central portion thereof disposed beneath the cruciform plate and the upper ends thereof extending toward but being spaced from the upper cruciform plate, and lead wires extending from the upper ends of said heating element and secured to the upper cruciform plate.

6. An electric immersion heater as set forth in claim 5, wherein the upper cruciform plate has apertures in the arms thereof through which the lead wires extend.

7. An electric immersion heater as set forth in claim 5, wherein the upper cruciform plate has apertures in the arms thereof and slots extending from each aperture to an edge of the associated arm, and wherein the lead wires are threaded into the apertures with the aid of the slot.

8. An electric immersion heater as set forth in claim 5, wherein the resistance heating element is a spiral coil.

9. An electric immersion heater as set forth in claim 5, wherein the resistance heating element is an iron resistance bar.

10. An electric immersion heater comprising an elongated hollow casing, an elongated frame slidably received in said casing and abutting against the interior of said casing adjacent the bottom end thereof, a bare electric resistance heating element carried by said frame and a vented screw cap closing off the other end of said casing, whereby said frame and element are retained within said casing and can be easily removed and replaced.

11. An electric immersion heater comprising a hollow elongated casing open at both ends thereof, said casing having effluxive openings along its side walls which are spaced apart axially of the casing, means to removably close the top of said casing, said means having a vent opening therethrough, the open bottom end of said casing having influxive openings in the bottom edge thereof, an inwardly directed annular rib extending around said casing adjacent the bottom edge thereof, an elongated frame slidably received in said casing and abutting against said rib, a bare electric resistance heating element carried by said frame, said heating element being disposed between the influxive and effluxive openings, the top of said element being below and remote from the uppermost of the effluxive openings and the bottom of said element being disposed above the influxive openings, the uppermost of said effluxive openings being below and remote from the closed top end of the casing.

SIMON L. APATOW.

REFERENCES CITED

The following references are of record in the file of this patent:

UNITED STATES PATENTS

| Number | Name | Date |
|---|---|---|
| 1,026,862 | Hengell | May 21, 1912 |
| 1,079,066 | Rice | Nov. 18, 1913 |
| 1,618,364 | Clark et al. | Feb. 22, 1927 |
| 1,818,808 | Max | Aug. 11, 1931 |
| 1,117,277 | Supplee | Nov. 17, 1914 |
| 1,437,481 | Armstrong | Dec. 5, 1922 |
| 985,344 | Harvie et al. | Feb. 28, 1911 |
| 1,662,555 | Wojciechowski | Mar. 13, 1928 |
| 1,470,834 | Hasselbach | Oct. 16, 1923 |

FOREIGN PATENTS

| Number | Country | Date |
|---|---|---|
| 188,518 | Great Britain | Nov. 16, 1922 |